United States Patent
Tsunoda

(10) Patent No.: US 9,762,804 B2
(45) Date of Patent: Sep. 12, 2017

(54) IMAGE PROCESSING APPARATUS, IMAGE PICKUP APPARATUS, AND IMAGE PROCESSING METHOD FOR ABERRATION CORRECTION

(71) Applicant: CANON KABUSHIKI KAISHA, Tokyo (JP)

(72) Inventor: Masayoshi Tsunoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/872,283

(22) Filed: Oct. 1, 2015

(65) Prior Publication Data

US 2016/0112646 A1 Apr. 21, 2016

(30) Foreign Application Priority Data

Oct. 15, 2014 (JP) ................. 2014-211042

(51) Int. Cl.
*H04N 5/217* (2011.01)
*H04N 5/232* (2006.01)
*H04N 5/347* (2011.01)
*H04N 5/369* (2011.01)

(52) U.S. Cl.
CPC ......... *H04N 5/23296* (2013.01); *H04N 5/217* (2013.01); *H04N 5/347* (2013.01); *H04N 5/23245* (2013.01); *H04N 5/3696* (2013.01)

(58) Field of Classification Search
CPC ...... H04N 5/3696; H04N 5/347; H04N 9/045; H04N 5/378; H04N 5/765; H04N 5/23293; H04N 5/23296; H04N 5/217; H04N 5/23245; A61B 5/0077
See application file for complete search history.

(56) References Cited

U.S. PATENT DOCUMENTS

| | | | | |
|---|---|---|---|---|
| 2005/0053307 A1* | 3/2005 | Nose | ............ | G06T 3/0018 382/275 |
| 2008/0137980 A1* | 6/2008 | Mizuno | ............ | G06T 5/006 382/255 |
| 2008/0239107 A1* | 10/2008 | Cho | ............ | H04N 5/217 348/241 |
| 2012/0027320 A1* | 2/2012 | Nakazono | ............ | H04N 5/3572 382/275 |
| 2013/0286254 A1* | 10/2013 | Watanabe | ............ | H04N 5/2355 348/239 |

FOREIGN PATENT DOCUMENTS

| | | |
|---|---|---|
| JP | 2003-219246 A | 7/2003 |
| JP | 2005-057605 A | 3/2005 |

* cited by examiner

*Primary Examiner* — Hung Lam
(74) *Attorney, Agent, or Firm* — Fitzpatrick, Cella, Harper & Scinto

(57) ABSTRACT

An image processing apparatus includes a determination unit (105) configured to determine a zooming direction, and a calculation unit (109) configured to calculate a correction coefficient for correcting aberration at a zoom position predicted from the zooming direction.

12 Claims, 14 Drawing Sheets

IMAGE PROCESSING APPARATUS, IMAGE PICKUP APPARATUS, AND IMAGE PROCESSING METHOD FOR ABERRATION CORRECTION

BACKGROUND OF THE INVENTION

Field of the Invention

The present invention relates to an image processing apparatus, especially to a distortion correction when an image changes continuously.

Description of the Related Art

Various kinds of methods are disclosed for applying a lens optical correction such as distortion correction to a digital single-lens camera, which has an interchangeable lens. For example, Japanese Patent Laid-open No. 2003-219246 discloses a method that stores a distortion correction amount for each zoom position, acquires a zoom position at image capturing, acquires a correction amount for the zoom position, and applies a correction. Japanese Patent Laid-open No. 2005-57605 discloses another method that stores a distortion correction amount for each zoom position, calculates a distortion correction amount through an interpolation process when no distortion correction amount is stored for a zoom position at image capturing, and applies a correction.

Since the lens of the digital single-lens camera is interchangeable, it is difficult to store, in the digital single-lens camera, distortion correction coefficients for all lenses. Thus, it is required to calculate a necessary distortion correction coefficient when needed before applying a distortion correction. When a lens optical correction is preformed at still image capturing, there is time to calculate a distortion correction coefficient and apply a correction after an image capturing instruction (command) is received from the user of the digital single-lens camera. However, when an image changes continuously during, for example, a live view and moving image capturing, there is likely to be no time to calculate the distortion correction coefficient in accordance with a zoom change and apply a correction. For this reason, the distortion correction is likely to be applied with a delay from the zoom change at live view image capturing through the digital single-lens camera.

SUMMARY OF THE INVENTION

The present invention provides an image processing apparatus, an image pickup apparatus, and an image processing method that have advantage in performing a distortion correction when an image changes continuously.

An image processing apparatus as one aspect of the present invention includes a determination unit configured to determine a zooming direction, and a calculation unit configured to calculate a correction coefficient for correcting aberration at a zoom position predicted from the zooming direction.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
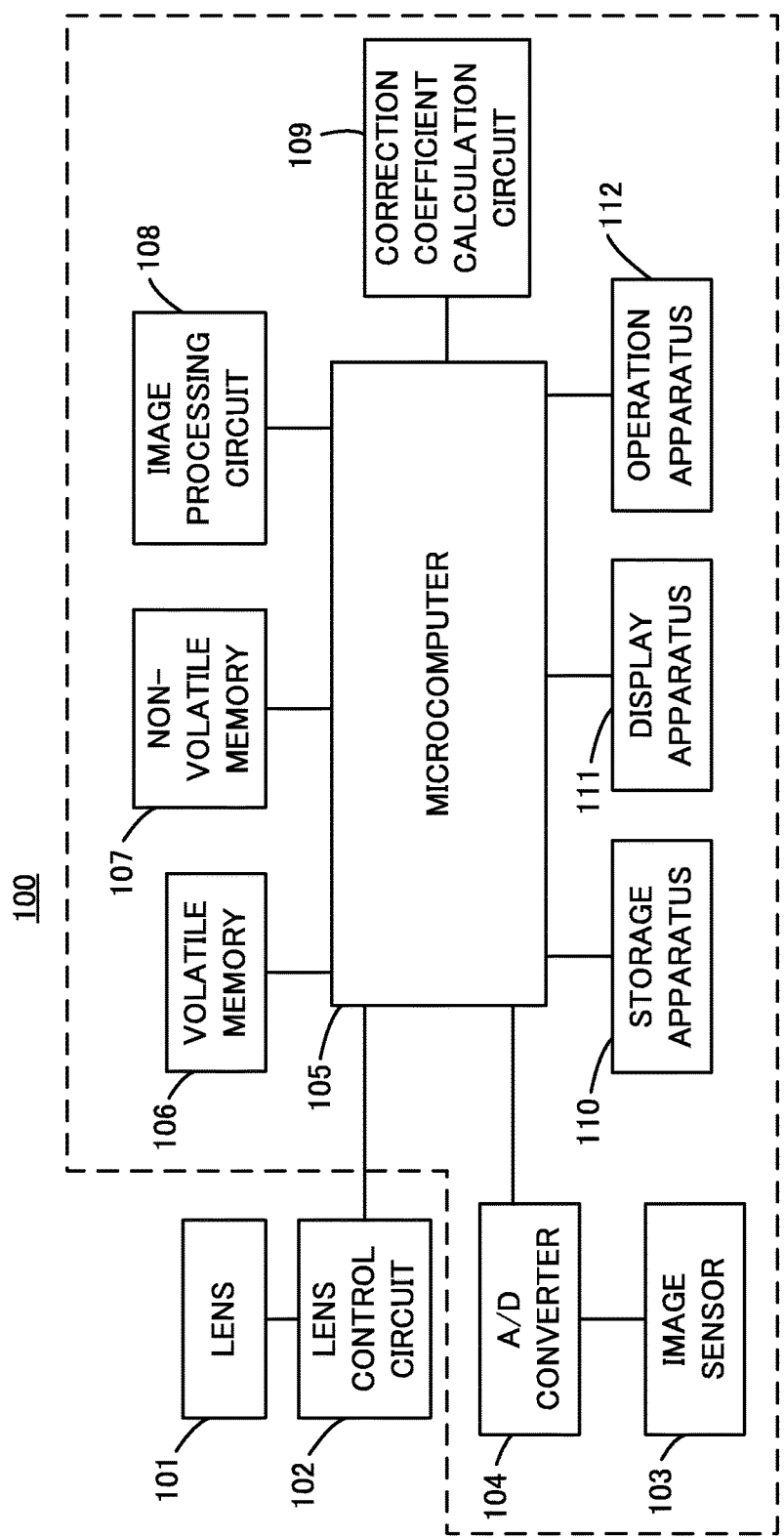
FIG. 1 is a configuration diagram of an entire image pickup system according to each embodiment of the present invention.

FIG. 1 is a block diagram of the configuration of an image pickup system to which an embodiment of the present invention is applied. In FIG. 1, reference numeral 101 denotes a lens that includes optical elements (not illustrated) such as a zoom lens, an aperture stop, and a focus lens, and is detachable from an image pickup apparatus 100 in the present embodiment. Light from an object is acquired through the lens 101. The lens 101 may be integrated with the image pickup apparatus 100. Reference numeral 102 denotes a lens control circuit that performs control and management of the lens such as zoom control of the lens 101, control of the aperture stop, and acquisition of the zooming direction and zoom position of the lens. In other words, the lens control circuit 102 serves as a detector that detects the zooming direction of the lens 101 and as an acquirer that acquires the zoom position thereof. The lens control circuit 102 may acquire information of a telephoto end and wide-angle end of a zoomable range of the lens 101 and information of the zooming speed of driving the lens. The lens control circuit 102 may be included in the image pickup apparatus or the lens. Reference numeral 103 denotes an image pickup element that cumulates information of light obtained through the lens 101 as electric charge.

In other words, the image pickup element 103 serves as an image pickup unit that receives light from the object through the lens 101 and generates image data. Reference numeral 104 denotes an A/D converter that converts information of the electric charge obtained by the image pickup element 103 into digital data. Reference numeral 105 denotes a microcomputer that performs, for example, operation control of the image pickup apparatus 100, sequence control of image processing, and control of distortion correction processing. The microcomputer 105 can receive (communicate), for example, information (signal) of the lens such as the zooming direction and zoom position of the lens from the lens control circuit 102. In this manner, the microcomputer 105 can serve as a determiner (determination unit) that determines the zooming direction of the lens.

Reference numeral 106 denotes a volatile memory used by the microcomputer 105 to perform control and by an image processing circuit 108 and a correction coefficient calculation circuit 109 to perform processing. Reference numeral 107 denotes a non-volatile memory that stores, for example, setting information of the image pickup apparatus 100, correction coefficient parameters of a distortion correction, information of the image pickup element, and parameters of image processing. Reference numeral 108 denotes an image processing circuit that is controlled by the microcomputer 105 to perform development processing and distortion correction processing on information obtained from the image pickup element 103 through the A/D converter 104. In other words, the image processing circuit 108 serves as a corrector (correction unit) that performs correction processing on image data obtained from the image pickup element 103 using a distortion correction coefficient described later. Reference numeral 109 denotes a correction coefficient calculation circuit that calculates lens optics correction coefficients necessary for distortion, chromatic aberration, peripheral light quantity falloff, and the like based on the correction coefficient parameters stored in the non-volatile memory 107. The correction coefficient calculation circuit 109 serves as a calculator (calculation unit) that calculates a correction coefficient (correction data) for correcting aberration of a mounted lens at the current zoom position and calculates a correction coefficient for correcting aberration at a zoom position predicted from the zooming direction of the lens as described later. The distortion correction coefficient calculated by the correction coefficient calculation circuit 109 is stored in the volatile memory 106.

In other words, the volatile memory 106 serves as a storage that stores the distortion correction coefficient calculated by the correction coefficient calculation circuit 109. The volatile memory 106 can store one or a plurality of distortion correction coefficients. A memory region available to store a plurality of distortion correction coefficients is allocated on the volatile memory 106 for prediction. The correction coefficient calculation circuit 109 is a component different from the microcomputer 105, of which processing may be performed by the microcomputer 105. Reference numeral 110 denotes a storage apparatus that stores image data obtained from the image processing circuit 108. The storage apparatus 110 may be built in or detachable from the image pickup apparatus 100. Reference numeral 111 denotes a display apparatus that displays image capturing settings and captured images. Reference numeral 112 denotes an operation apparatus that has a button and a switch and receives an input from a user. An operation received by the operation apparatus 112 from the user is performed by components being controlled by the microcomputer 105 in accordance with processing content.

In the present embodiment, the microcomputer 105, the volatile memory 106, the non-volatile memory 107, the image processing circuit 108, and the correction coefficient calculation circuit 109 serve as an image processing apparatus. The image processing apparatus in the present embodiment includes a lens information acquirer that acquires lens information from the lens control circuit 102, and an image data acquirer that acquires image data generated by the image pickup element 103.

Figure 2:
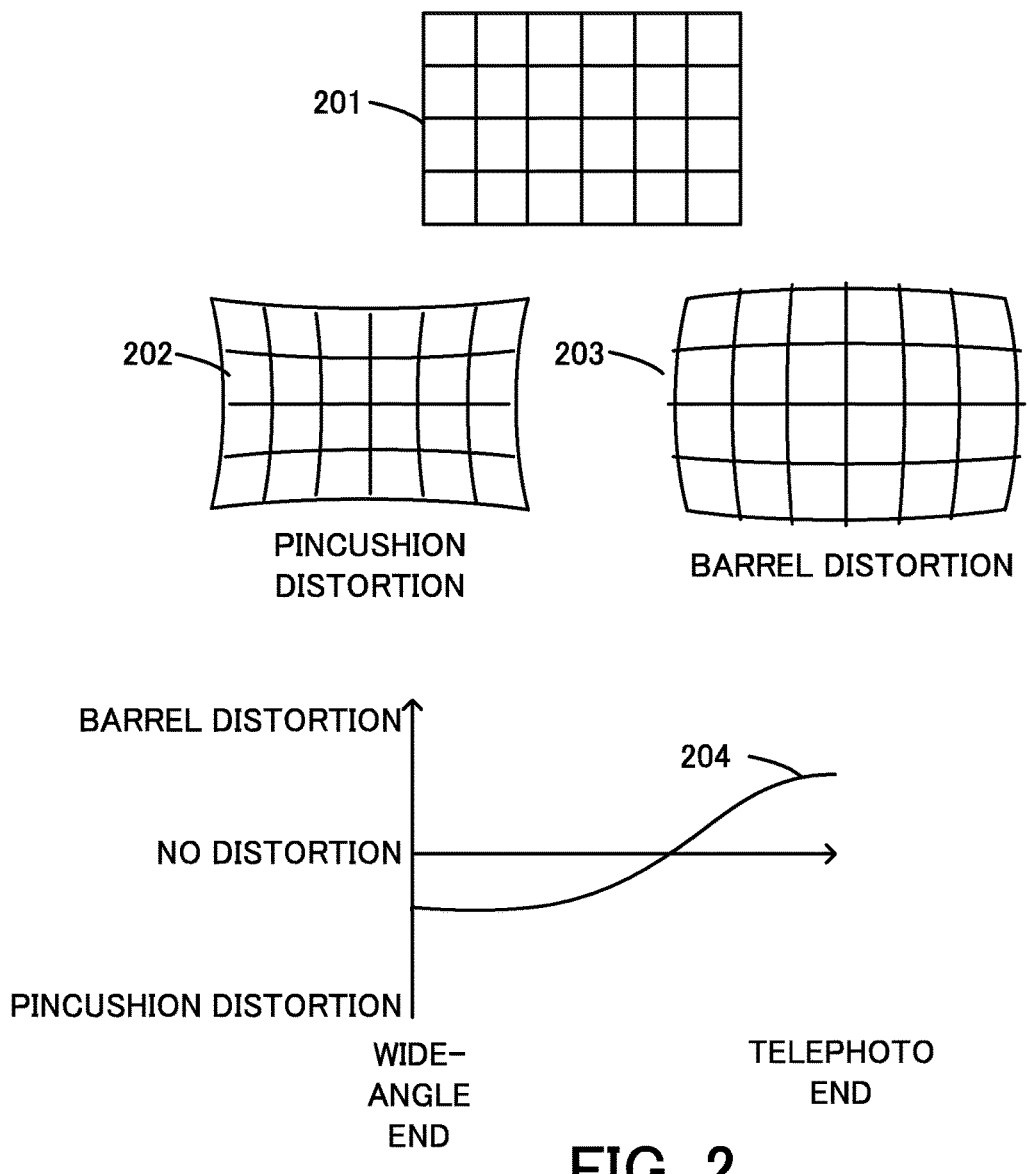
FIG. 2 is an explanatory diagram of a characteristic of distortion correction according to each embodiment of the present invention.

FIG. 2 illustrates distortion characteristics of an image. Reference numeral 201 denotes a normal image without distortion. Reference numeral 202 denotes an image in which a pincushion distortion is generated on the normal image 201. Reference numeral 203 denotes an image in which a barrel distortion is generated on the normal image 201. Reference numeral 204 denotes a distortion characteristic curve of the lens. The horizontal axis represents the zoom position of the lens, and the vertical axis represents the intensity of the distortion characteristic. The left end of the horizontal axis corresponds to the most wide-angle side (wide-angle end) of the zoom position, and the right end thereof corresponds to the most telephoto side (telephoto end) of the zoom position. On the vertical axis, a central part corresponds to no distortion, the barrel distortion is present above the center part and stronger at the higher part, and the pincushion distortion is present below the central part and stronger at the lower part. The distortion characteristic curve 204 of the lens is used in a calculation to predict a distortion correction coefficient. The distortion characteristic curve 204 may be stored in the non-volatile memory 107 and the storage apparatus 110 of the image pickup apparatus 100, or may be acquired from the lens 101 when mounted.

Embodiment 1

Figure 3:
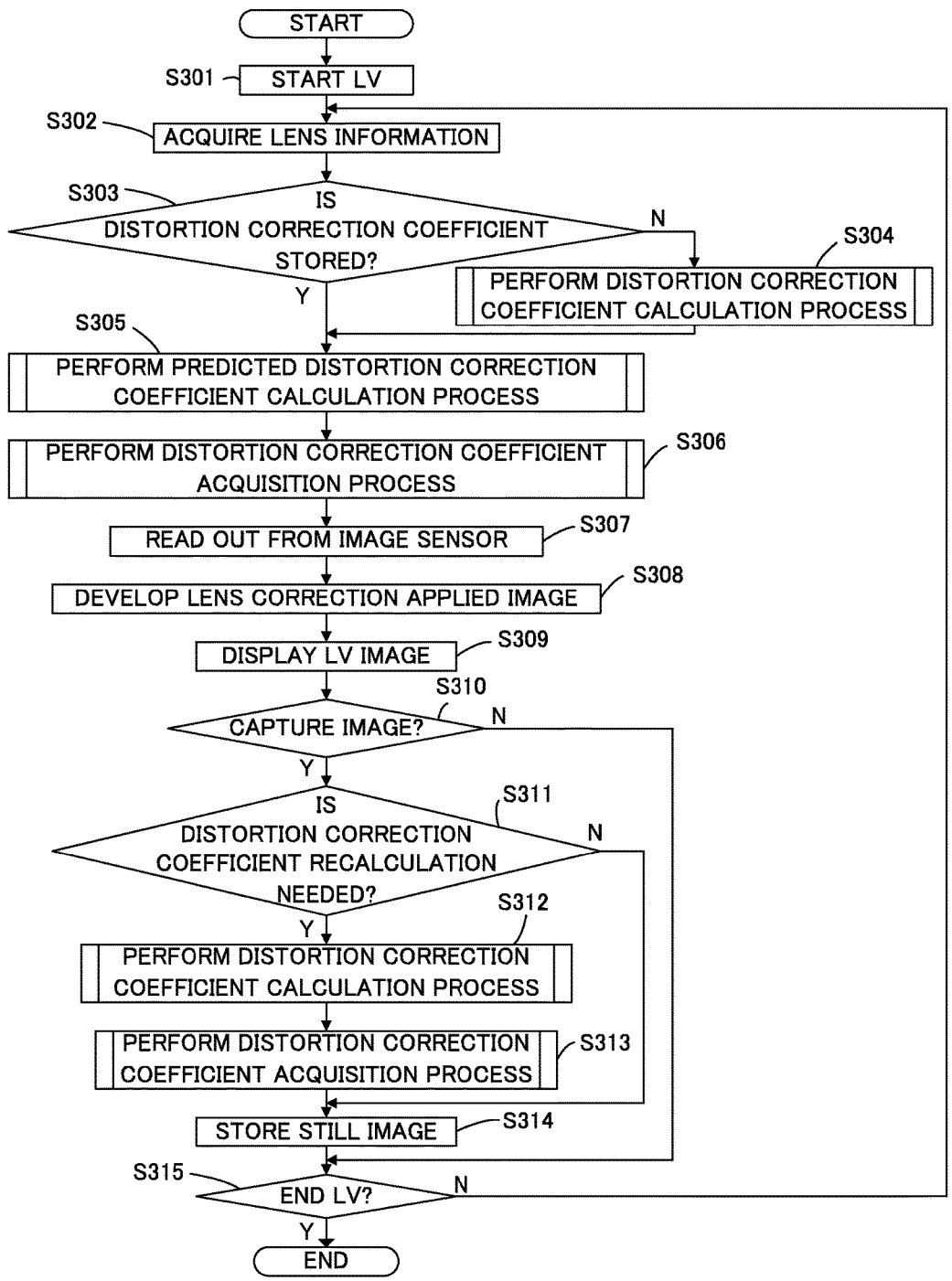
FIG. 3 is a flowchart of live-view image capturing control according to Embodiment 1 of the present invention.

FIG. 3 is a flowchart of control according to Embodiment 1 of the present invention. At step S301, the microcomputer 105 starts a live view. At step S302, the microcomputer 105 controls the lens control circuit 102 to acquire the lens information such as the zoom position, the zooming direction, the telephoto end, and the wide-angle end of the lens. When it is determined at step S303 that the volatile memory 106 does not store a distortion correction coefficient corresponding to the zoom position of the lens, the microcomputer 105 executes a distortion correction coefficient calculation process illustrated in FIG. 4 using the correction coefficient calculation circuit 109 at step S304. When it is determined at step S303 that the volatile memory 106 stores the distortion correction coefficient, or when the process at step S304 is completed, the microcomputer 105 executes a predicted distortion correction coefficient calculation process illustrated in FIG. 5 using the correction coefficient calculation circuit 109 at step S305. At step S306, the microcomputer 105 executes a distortion correction coefficient acquisition process illustrated in FIG. 6 to acquire the distortion correction coefficient corresponding to the zoom position. At step S307, the microcomputer 105 reads out image data from the image sensor 103, and applies the distortion correction coefficient acquired at step S306 to the image processing circuit 108 to develop a live view image at step S308. After that, the microcomputer 105 displays the live view image on the display apparatus 111 at step S309. When it is determined at step S310 that an image capturing instruction is issued, the microcomputer 105 executes a still image capturing process at steps S311 to S314. When no instruction is issued, the microcomputer 105 determines at step S315 whether an instruction to end the live view is issued.

Figure 4:
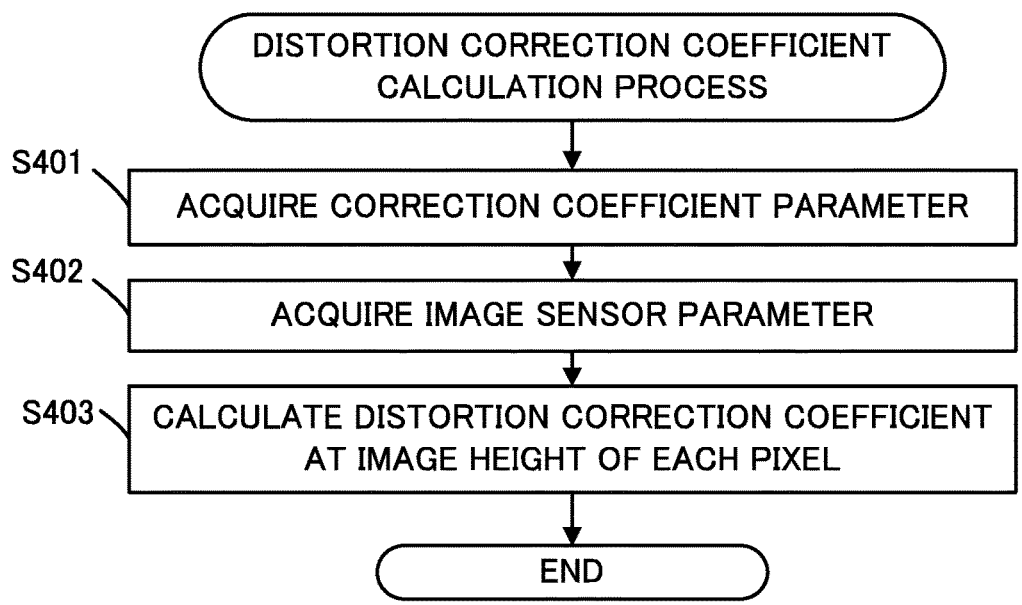
FIG. 4 is a flowchart of a distortion correction coefficient calculation process according to each embodiment of the present invention.
Figure 6:
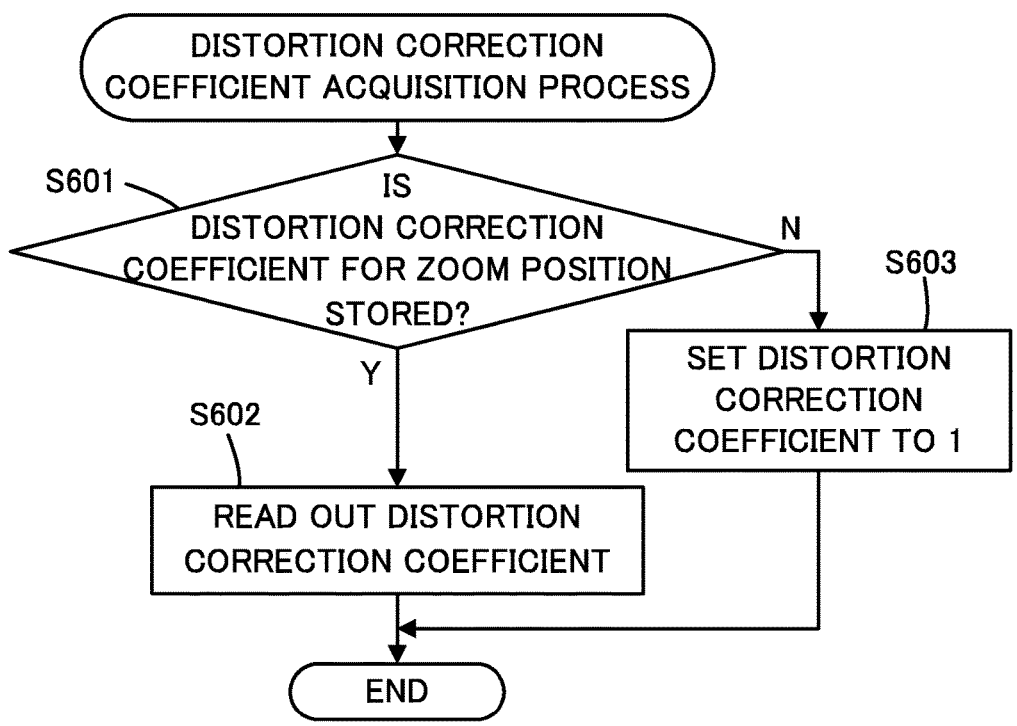
FIG. 6 is a flowchart of a distortion correction coefficient acquisition process according to each embodiment of the present invention.

When it is determined at step S311 based on the distortion correction coefficient acquired at step S306 that a recalculation is needed, the microcomputer 105 executes, at step S312, the distortion correction coefficient calculation process illustrated in FIG. 4 using the correction coefficient calculation circuit 109, and executes the distortion correction coefficient acquisition process illustrated in FIG. 6 at step S313. The recalculation is determined to be needed when, for example, the zoom position of the lens acquired at step S302 has changed before step S311.

After that, at step S314, the microcomputer 105 reads out the image data from the image sensor 103, applies the distortion correction coefficient acquired at step S306 or S313 to the image processing circuit 108 to develop a still image, and stores the still image in the storage apparatus 110. When it is determined at step S315 that the instruction to end the live view is issued, the microcomputer 105 ends this series of controls. When no instruction is issued, the microcomputer 105 returns to step S302 to continue the live view. In this manner, the microcomputer 105 can repeat still image capturing while performing the live view.

FIG. 4 is a flowchart of the distortion correction coefficient calculation process using the correction coefficient calculation circuit 109. At step S401, the microcomputer 105 acquires the correction coefficient parameters from the non-volatile memory 107. The correction coefficient parameters include at least a distortion characteristic at the zoom position, and a correction level at each image height. At step S402, the microcomputer 105 acquires information of the image sensor from the non-volatile memory 107. This information of the image sensor includes at least the size and the number of pixels of the image sensor. At step S403, the microcomputer 105 determines a correction method in accordance with an aberration characteristic acquired at step S401, and the microcomputer 105 calculates a distortion correction coefficient at each pixel based on the correction level at each image height and the size and the number of pixels of the image sensor. At the end, the microcomputer 105 stores a calculated coefficient in the volatile memory 106 at step S403.

Figure 5:
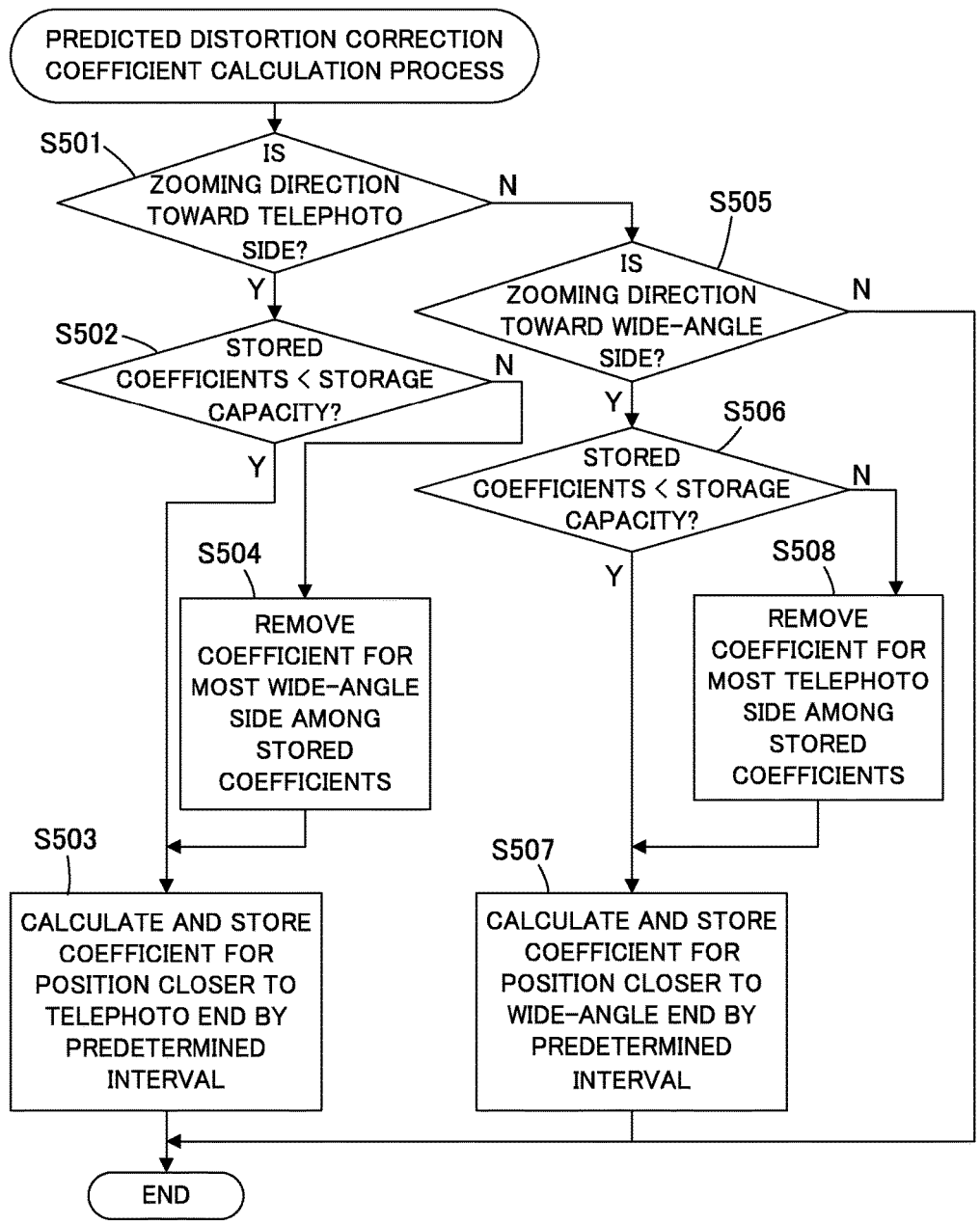
FIG. 5 is a flowchart of a predicted distortion correction coefficient calculation process according to each embodiment of the present invention.

FIG. 5 is a flowchart of the predicted distortion correction coefficient calculation process using the correction coefficient calculation circuit 109. The predicted distortion correction coefficient calculation is performed for each of points spaced at intervals for which the correction coefficient parameters are stored. When it is determined at step S501 that the zooming direction of the lens acquired at step S302 is toward the telephoto side, the microcomputer 105 starts the predicted distortion correction coefficient calculation process for the telephoto side at step S502. At step S502, the microcomputer 105 determines whether any memory capacity is available to store a predicted distortion correction coefficient to be newly calculated. When it is determined that no memory capacity is available, at step S504, the microcomputer 105 removes a predicted distortion correction coefficient for the most wide-angle side among stored predicted distortion correction coefficients from the volatile memory 106 to have the memory capacity available. In other words, when the zooming direction is toward a first side (the telephoto side) and no memory capacity is available to store a predicted distortion correction coefficient, the microcomputer 105 removes a correction coefficient for a second side (the wide-angle side) opposite to the first side (telephoto side) among the stored predicted distortion correction coefficients. When it is determined at step S502 that any memory capacity is available, or when the process at step S504 is completed, the microcomputer 105 specifies a zoom position closer to the telephoto end than those of the stored predicted distortion correction coefficients, and performs the distortion correction coefficient calculation process illustrated in FIG. 4 to calculate a predicted distortion correction coefficient at step S503.

Specifically, the microcomputer 105 calculates a predicted distortion correction coefficient for a position closer to the telephoto end than those of the stored predicted distortion correction coefficients by a predetermined interval. Then, the microcomputer 105 stores the calculated predicted distortion correction coefficient in the volatile memory 106. When it is determined at step S501 that the zooming direction is not toward the telephoto side, the microcomputer 105 determines at step S505 whether the zooming direction is toward the wide-angle side. When it is determined at step S505 that the zooming direction is toward the wide-angle side, the microcomputer 105 starts the predicted distortion correction coefficient calculation process for the wide-angle side at step S506. At step S506, the microcomputer 105 determines whether any memory capacity is available to store a predicted distortion correction coefficient to be newly calculated. When it is determined that no memory capacity is available, the microcomputer 105 removes a predicted distortion correction coefficient for the most telephoto side among the stored predicted distortion correction coefficients from the volatile memory 106 to have the memory capacity available at step S508. In other words, when the zooming direction is toward the first side (wide-angle side) and no memory capacity is available to store a predicted distortion correction coefficient, the microcomputer 105 removes a correction coefficient for the second side (telephoto side) opposite to the first side (wide-angle side) among the stored predicted distortion correction coefficients. When it is determined at step S506 that any memory capacity is available, or when the process at step S508 is completed, at step S507, the microcomputer 105 specifies a zoom position closer to the wide-angle end than those of the stored predicted distortion correction coefficients, and performs the distortion correction coefficient calculation process illustrated in FIG. 4 to calculate a predicted distortion correction coefficient. Specifically, the microcomputer 105 calculates a predicted distortion correction coefficient for a position closer to the wide-angle end than those of the stored predicted distortion correction coefficients by the predetermined interval. Then, the microcomputer 105 stores the calculated predicted distortion correction coefficient in the volatile memory 106. When the lens is not moving toward the telephoto side nor the wide-angle side in a stopping state at steps S501 and S505, the microcomputer 105 ends the process without calculating a predicted distortion correction coefficient.

FIG. 6 is a flowchart of the distortion correction coefficient acquisition process of acquiring a distortion correction coefficient stored in the volatile memory 106. At step S601, the microcomputer 105 determines whether a distortion correction coefficient to be acquired for a zoom position is stored in the volatile memory 106. When it is determined at step S601 that the distortion correction coefficient is stored, the microcomputer 105 reads out the distortion correction coefficient from the volatile memory 106 at step S602. When it is determined that the distortion correction coefficient is not stored, at step S603, the microcomputer 105 sets 1 as the value of the distortion correction coefficient so as to set no correction to be performed. At the end, at step S602, the microcomputer 105 returns the distortion correction coefficient acquired at step S603 to a caller.

As described above, in the present embodiment, the microcomputer 105 previously calculates and stores a distortion correction coefficient for a zoom position at which zooming is predicted to be performed, depending on the zooming direction of the lens. When applying a distortion correction, the microcomputer 105 reads out the stored distortion correction coefficient for the zoom position and applies the distortion correction on image data to develop an image.

This above-described embodiment previously stores predicted distortion correction coefficients to omit the distortion correction coefficient calculation process at a live view, thereby reducing a delay in applying a correction in the live view.

Embodiment 2

Embodiment 2 of the present invention performs a predicted distortion correction coefficient calculation control different from that in Embodiment 1. A live view operation is performed in accordance with the flowchart in FIG. 3 similarly to Embodiment 1. This operation is changed to call a predicted distortion correction coefficient calculation process illustrated in FIG. 7 so as to be applicable to a case in which the prediction at step S305 is completed up to the telephoto end or the wide-angle end.

Figure 7:
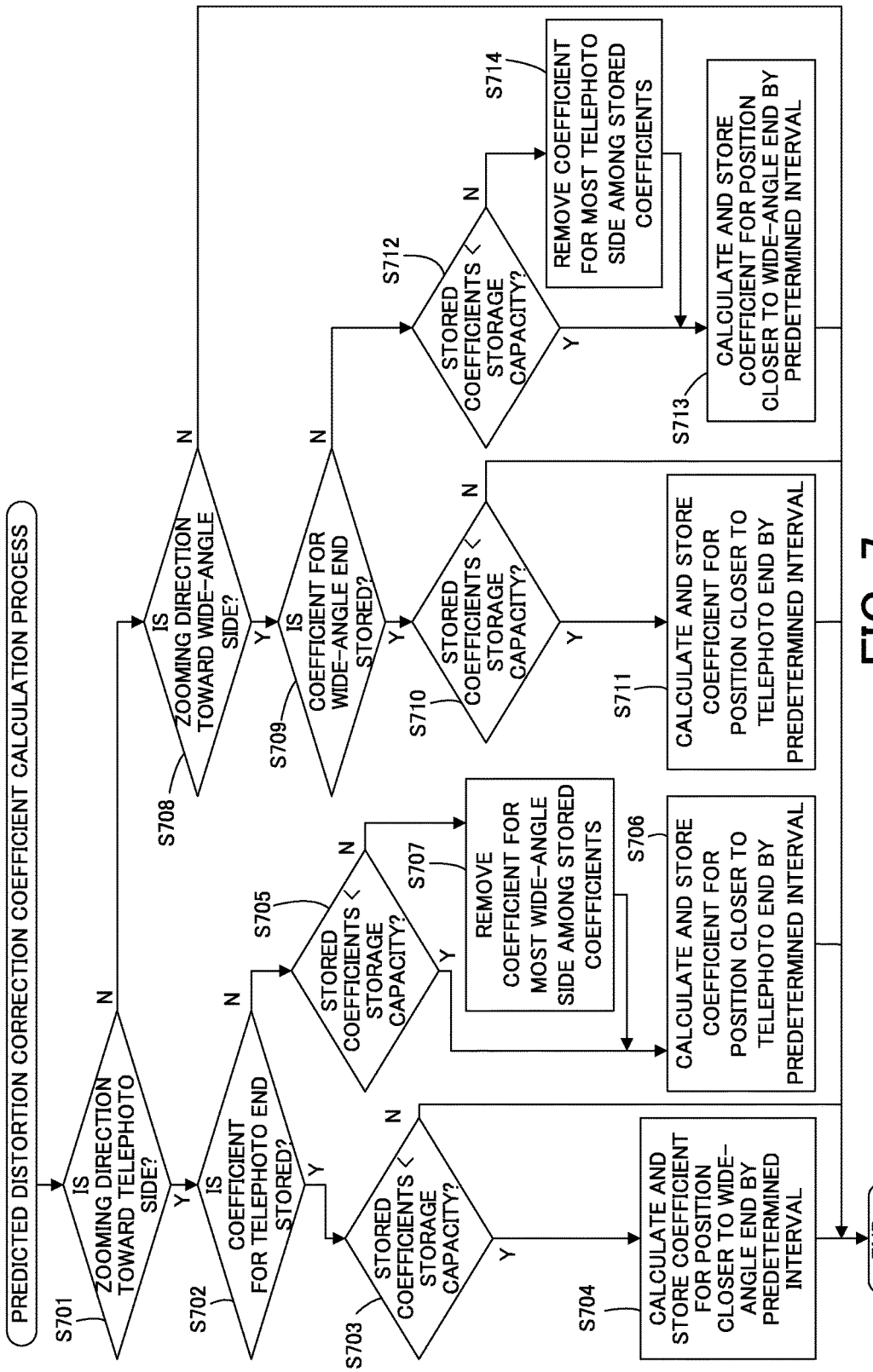
FIG. 7 is a flowchart of a predicted distortion correction coefficient calculation process according to Embodiment 2 of the present invention.

FIG. 7 is a flowchart of the predicted distortion correction coefficient calculation process with the different predicted distortion correction coefficient calculation control in the case in which the prediction is completed up to the telephoto end and the wide-angle end. The predicted distortion correction coefficient calculation is performed for each of the points spaced at intervals for which the correction coefficient parameters are stored. When it is determined at step S701 that the zooming direction of the lens acquired at step S302 is toward the telephoto side, the microcomputer 105 starts the predicted distortion correction coefficient calculation process for the telephoto side at step S702. When it is determined at step S702 that a distortion correction coefficient is stored for each position between the current zoom position and the telephoto end of a mounted lens, the microcomputer 105 determines at step S703 whether any memory capacity is available to store a predicted distortion correction coefficient to be newly calculated. When it is determined that any memory capacity is available, at step S704, the microcomputer 105 specifies a zoom position closer to the wide-angle end than those of the stored predicted distortion correction coefficients, and performs the distortion correction coefficient calculation process illustrated in FIG. 4 to calculate a predicted distortion correction coefficient.

Specifically, the microcomputer 105 calculates a predicted distortion correction coefficient for a position closer to the wide-angle end than those of the stored predicted distortion correction coefficients by the predetermined interval. Then, the microcomputer 105 stores the predicted distortion correction coefficient in the volatile memory 106. In other words, when the zooming direction is toward the first side (telephoto side), and the volatile memory 106 stores a correction coefficient for a zoomable end (the telephoto end) on the first side (telephoto side), the microcomputer 105 calculates a correction coefficient for the second side (wide-angle side) opposite to the first side. On the other hand, when it is determined at step S703 that no memory capacity is available, the microcomputer 105 ends the process. When it is determined at step S702 that the volatile memory 106 does not store the correction coefficient for the most telephoto side, the microcomputer 105 determines whether any memory capacity is available to store a predicted distortion correction coefficient to be newly calculated at step S705. When it is determined that no memory capacity is available, at step S707, the microcomputer 105 removes the predicted distortion correction coefficient for the most wide-angle side among the stored predicted distortion correction coefficients from the volatile memory 106 to have the memory capacity available. When it is determined at step S705 that any memory capacity is available, or when the process at step S707 is completed, at step S706, the microcomputer 105 specifies a zoom position closer to the telephoto end than those of the stored predicted distortion correction coefficients and performs the distortion correction coefficient calculation process illustrated in FIG. 4 to calculate a predicted distortion correction coefficient. Specifically, the microcomputer 105 calculates a predicted distortion correction coefficient for a position closer to the telephoto end than those of the stored predicted distortion correction coefficients by the predetermined interval.

Then, the microcomputer 105 stores the predicted distortion correction coefficient in the volatile memory 106. When it is determined at step S701 that the zooming direction is not toward the telephoto side, the microcomputer 105 determines at step S708 whether the zooming direction is toward the wide-angle side. When it is determined at step S708 that the zooming direction is toward the wide-angle side, the microcomputer 105 starts the predicted distortion correction coefficient calculation process for the wide-angle side at step S709. When it is determined at step S709 that a distortion correction coefficient is stored for each position between the current zoom position and the wide-angle end of the mounted lens, the microcomputer 105 determines whether any memory capacity is available to store a predicted distortion correction coefficient to be newly calculated at step S710. When it is determined that any memory capacity is available, at step S711, the microcomputer 105 specifies a zoom position closer to the telephoto end than those of the stored predicted distortion correction coefficients and performs the distortion correction coefficient calculation process illustrated in FIG. 4 to calculate a predicted distortion correction coefficient. Specifically, the microcomputer 105 calculates a predicted distortion correction coefficient for a position closer to the telephoto end than those of the stored predicted distortion correction coefficients by the predetermined interval. Then, the microcomputer 105 stores the predicted distortion correction coefficient in the volatile memory 106. In other words, when the zooming direction is toward the first side (wide-angle side), and the volatile memory 106 stores a correction coefficient for a zoomable end (the wide-angle end) on the first side (wide-angle side), the microcomputer 105 calculates a correction coefficient for the second side (the telephoto side) opposite to the first side.

On the other hand, when it is determined at step S710 that no memory capacity is available, the microcomputer 105 ends the process. When it is determined at step S709 that the volatile memory 106 does not store a correction coefficient for the most wide-angle side, the microcomputer 105 determines whether any memory capacity is available to store a predicted distortion correction coefficient to be newly calculated at step S712. When it is determined that no memory capacity is available, at step S714, the microcomputer 105 removes a predicted distortion correction coefficient for the most telephoto side among the stored predicted distortion correction coefficients from the volatile memory 106 to have the memory capacity available. When it is determined at step S712 that any memory capacity is available, or when the process at step S714 is completed, at step S713, the microcomputer 105 specifies a zoom position closer to the wide-angle end than those of the stored predicted distortion correction coefficients and performs the distortion correction coefficient calculation process illustrated in FIG. 4 to calculate a predicted distortion correction coefficient. Specifically, the microcomputer 105 calculates a predicted distortion correction coefficient for a position closer to the wide-angle end than those of the stored predicted distortion correction coefficients by the predetermined interval. Then, the microcomputer 105 stores the predicted distortion correction coefficient in the volatile memory 106. When the lens is not moving toward the telephoto side nor the wide-angle side in a stopping state at steps S701 and S708, the microcomputer 105 ends the process without calculating a predicted distortion correction coefficient.

The above configuration allows a predicted distortion correction coefficient to be calculated for a position in a direction with a larger movable range near each of the telephoto end and the wide-angle end of the lens, thereby reducing a delay in applying a correction in the live view in an operation of moving away from the end.

Embodiment 3

Figure 8:
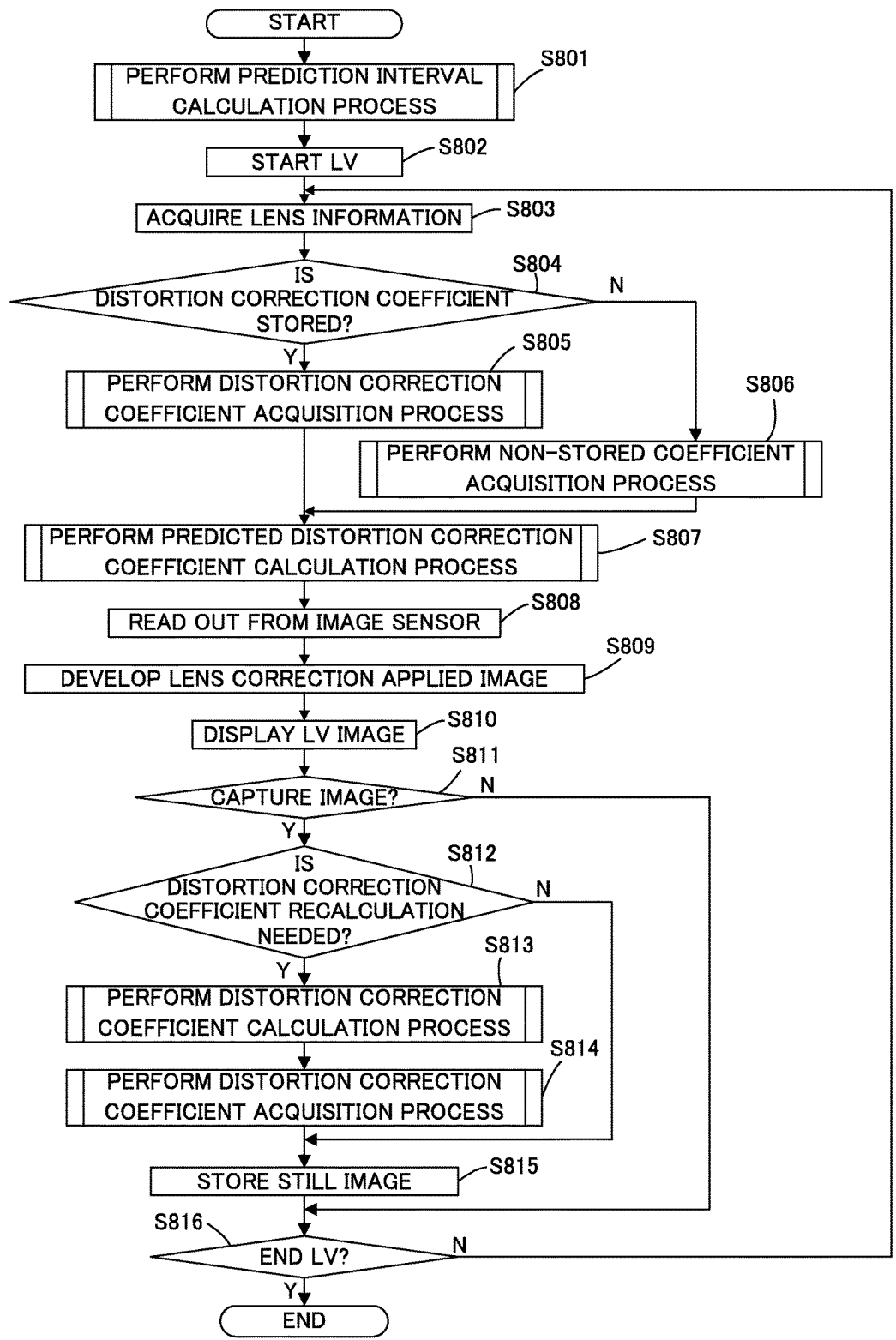
FIG. 8 is a flowchart of live-view image capturing control according to Embodiment 3 of the present invention.

FIG. 8 is a flowchart of control according to Embodiment 3 of the present invention. First, at step S801, the microcomputer 105 calls a prediction interval calculation process illustrated in FIG. 9 to calculate a calculation interval of predicted distortion correction coefficients. Next at step S802, the microcomputer 105 starts a live view. At step S803, the microcomputer 105 controls the lens control circuit 102 to acquire the lens information such as the zoom position, the zooming direction, the telephoto end, and the wide-angle end of the lens. When it is determined at step S804 that the volatile memory 106 stores a distortion correction coefficient corresponding to the zoom position of the lens, at step S805, the microcomputer 105 executes the distortion correction coefficient acquisition process illustrated in FIG. 6 to acquire the distortion correction coefficient corresponding to the zoom position. When it is determined that the volatile memory 106 does not store the distortion coefficient, at step S806, the microcomputer 105 executes a non-stored coefficient acquisition process illustrated in FIG. 10 to acquire the distortion correction coefficient corresponding to the zoom position. After the process at step S805 or S806, the microcomputer 105 executes the predicted distortion correction coefficient calculation process illustrated in FIG. 5 using the correction coefficient calculation circuit 109 at step S807. The predetermined interval of the zoom position at steps S503 and S507 in the predicted distortion correction coefficient calculation process illustrated in FIG. 5 is set based on a calculation interval obtained through the prediction interval calculation process illustrated in FIG. 9 described later.

At step S808, the microcomputer 105 reads out image data from the image sensor 103, and applies the distortion correction coefficient acquired at step S805 or S806 to the image processing circuit 108 to develop a live view image at step S809. After that, at step S810, the microcomputer 105 displays the live view image on the display apparatus 111. When it is determined at step S811 that an image capturing instruction is issued, the microcomputer 105 performs a still image capturing process at steps S812 to S815. When no instruction is issued, the microcomputer 105 determines at step S816 whether an instruction to end the live view is issued. When it is determined at step S812 based on the distortion correction coefficient acquired at step S805 or S806 that a recalculation is needed, the microcomputer 105 executes the distortion correction coefficient calculation process illustrated in FIG. 4 using the correction coefficient calculation circuit 109 at step S813, and then executes the distortion correction coefficient acquisition process illustrated in FIG. 6 at step S814. The recalculation is determined to be needed when, for example, the zoom position of the lens acquired at step S803 has changed before step S812.

After that, the microcomputer 105 reads out image data from the image sensor 103 at step S815, and applies the distortion correction coefficient acquired at step S805, S806, or S814 to the image processing circuit 108 to develop a still image and store the still image in the storage apparatus 110. When it is determined at step S816 that an instruction to end the live view is issued, the microcomputer 105 ends this series of controls. When no instruction is issued, the microcomputer 105 returns to step S802 to continue the live view. In this manner, the microcomputer 105 can repeat still image capturing while performing the live view.

Figure 9:
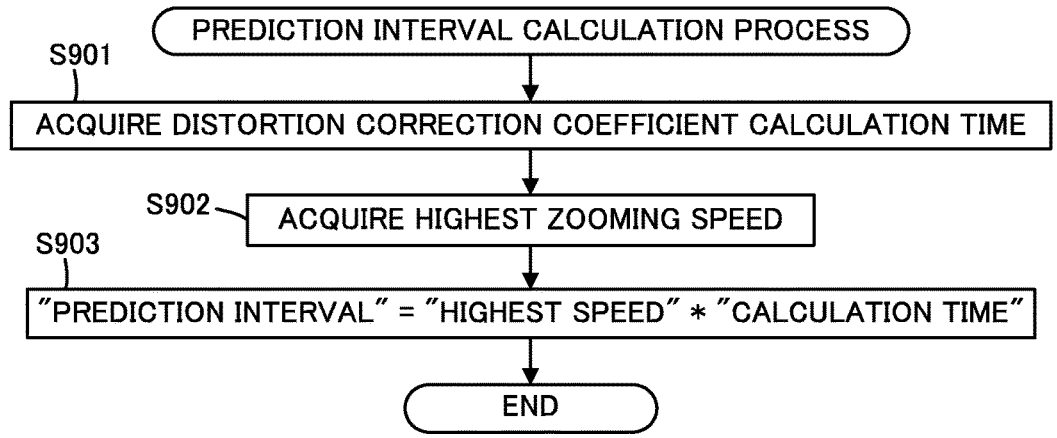
FIG. 9 is a flowchart of a predicted distortion correction coefficient calculation interval acquisition process according to each embodiment of the present invention.

FIG. 9 is a flowchart of the prediction interval calculation process for calculating the calculation interval of predicted distortion correction coefficients. At step S901, the microcomputer 105 acquires a time (calculation time) needed to calculate a distortion correction coefficient. This acquisition may be made based on a measured time of the coefficient calculation in an initial state or a previously measured time stored in the non-volatile memory 107. In other words, the microcomputer 105 serves as a coefficient calculation time acquirer that acquires a processing (calculation) time needed to calculate a distortion correction coefficient from the non-volatile memory 107.

At step S902, the microcomputer 105 acquires the highest speed of a zoom drive of the lens via the lens control circuit 102. After that, at step S903, based on information acquired at steps S901 and S902, the microcomputer 105 calculates a prediction interval of calculation of predicted distortion correction coefficients based on the time needed to calculate a predicted distortion correction coefficient and the zooming speed (speed of a zoom drive of the lens). Specifically, the microcomputer 105 calculates the prediction interval as the product of the highest speed and the calculation time, and the microcomputer 105 returns the prediction interval to a caller at the end.

Figure 10:
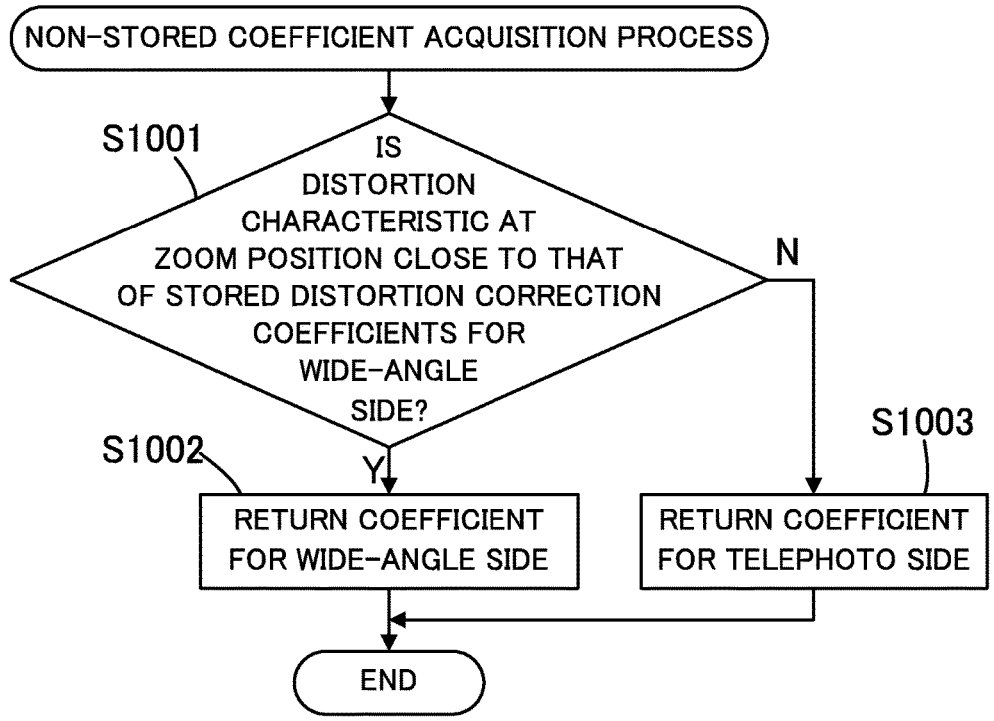
FIG. 10 is a flowchart of a distortion correction coefficient acquisition process when a prediction was missed according to each embodiment of the present invention.

FIG. 10 is a flowchart of the non-stored coefficient acquisition process for acquiring a distortion correction coefficient not stored, when a prediction was missed. At step S1001, the microcomputer 105 makes a comparison to determine whether the distortion characteristic at the zoom position acquired at step S803 is closer to that of stored distortion correction coefficients for the wide-angle side or the telephoto side. The comparison of distortion characteristics puts priority on the curve 204 in FIG. 2 of a characteristic that belongs to the same characteristic category, and determines that the distortion characteristic at the zoom position is closer to that of a side on which the distortion characteristic has a gradient closer to those of the stored distortion correction coefficients. When it is determined based on this determination criteria that the distortion characteristic at the zoom position is closer to that of the wide-angle side, the microcomputer 105 acquires a coefficient for the wide-angle side from the volatile memory 106 and returns the coefficient at step S1002. On the other hand, when it is determined that the distortion characteristic at the zoom position is closer to that of the telephoto side, the microcomputer 105 acquires a coefficient for the telephoto side from the volatile memory 106 and returns the coefficient at step S1003.

The above configuration allows a prediction to be performed in accordance with the zooming speed and the distortion correction coefficient calculation time, thereby reducing a delay in applying a distortion correction in the live view.

Embodiment 4

Figure 11:
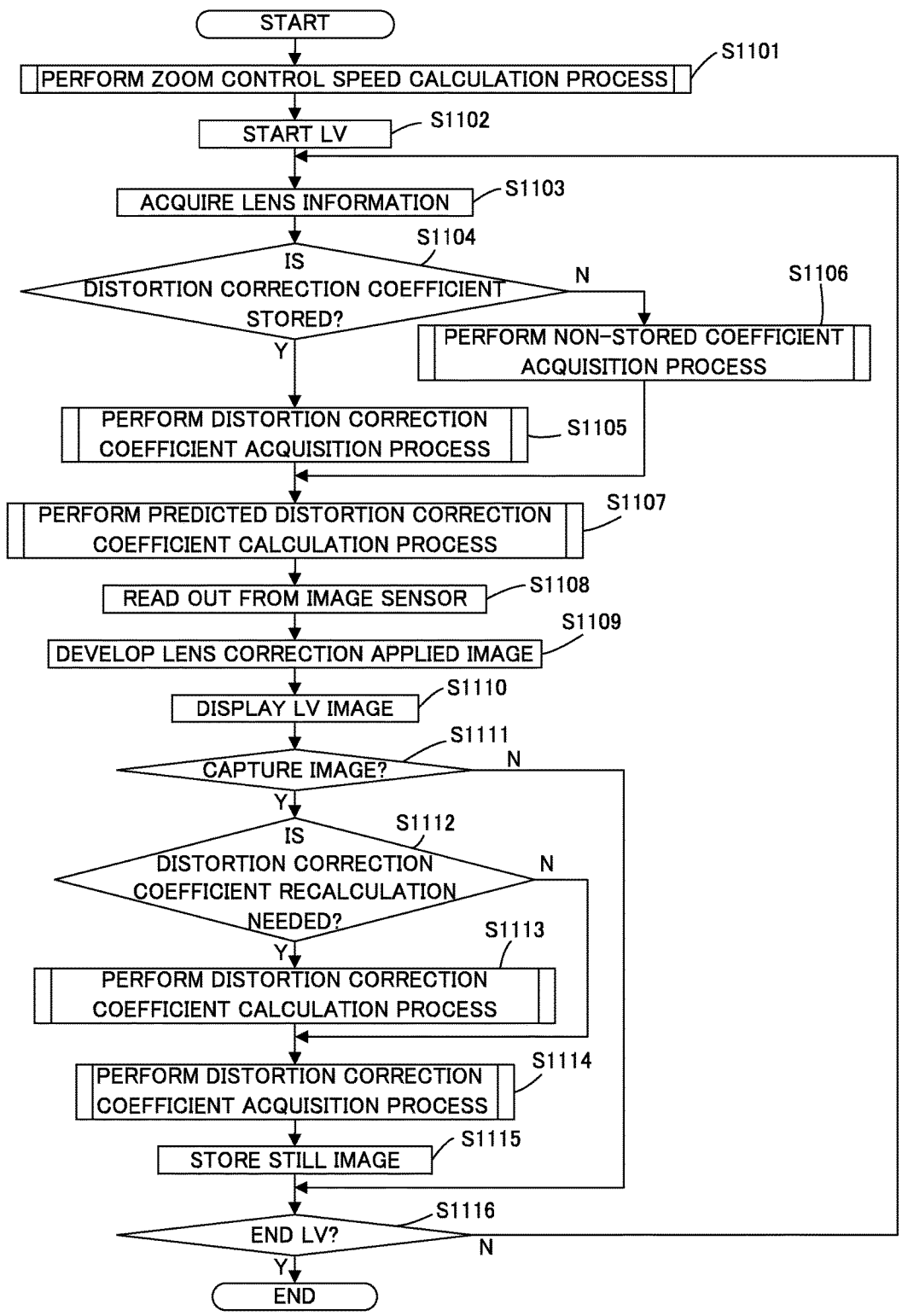
FIG. 11 is a flowchart of live-view image capturing control according to Embodiment 4 of the present invention.

FIG. 11 is a flowchart of control according to Embodiment 4 of the present invention. First, at step S1101, the microcomputer 105 executes a zoom control speed calculation process illustrated in FIG. 12 for determining a zoom control speed, depending on a stored zoom interval at which parameters for calculating a distortion correction coefficient are stored. Next at step S1102, the microcomputer 105 starts a live view. At step S1103, the microcomputer 105 controls the lens control circuit 102 to acquire the lens information such as the zoom position, the zooming direction, the telephoto end, and the wide-angle end of the lens. When it is determined at step S1104 that the volatile memory 106 stores a distortion correction coefficient corresponding to the zoom position of the lens, at step S1105, the microcomputer 105 executes the distortion correction coefficient acquisition process illustrated in FIG. 6 to acquire the distortion correction coefficient corresponding to the zoom position. When it is determined that the volatile memory 106 does not store the distortion coefficient, at step S1106, the microcomputer 105 executes the non-stored coefficient acquisition process illustrated in FIG. 10 to acquire the distortion correction coefficient corresponding to the zoom position. After step S1105 or S1106, the microcomputer 105 executes the predicted distortion correction coefficient calculation process illustrated in FIG. 5 using the correction coefficient calculation circuit 109 at step S1107.

At step S1108, the microcomputer 105 reads out image data from the image sensor 103, and at step S1109, applies the distortion correction coefficient acquired at step S1105 or S1106 to the image processing circuit 108 to develop a live view image. After that, at step S1110, the microcomputer 105 displays the live view image on the display apparatus 111. When it is determined at step S1111 that an image capturing instruction is issued, the microcomputer 105 executes a still image capturing process at steps S1112 to S1115. When no instruction is issued, the microcomputer 105 determines at step S1116 whether an instruction to end the live view is issued. When it is determined at step S1112 based on the distortion correction coefficient acquired at step S1105 or S1106 that a recalculation is needed, the microcomputer 105 executes the distortion correction coefficient calculation process illustrated in FIG. 4 using the correction coefficient calculation circuit 109 at step S1113, and then executes the distortion correction coefficient acquisition process illustrated in FIG. 6 at step S1114. The recalculation is determined to be needed when, for example, the zoom position of the lens acquired at step S1103 has changed before step S1112.

After that, the microcomputer 105 reads out image data from the image sensor 103 at step S1115, and applies the distortion correction coefficient acquired at step S1105, S1106, or S1114 to the image processing circuit 108 to develop a still image and store the still image in the storage apparatus 110. When it is determined at step S1116 that an instruction to end the live view is issued, the microcomputer 105 ends this series of controls. When no instruction is issued, the microcomputer 105 returns to step S1102 to continue the live view. In this manner, the microcomputer 105 can repeat still image capturing while performing the live view.

Figure 12:
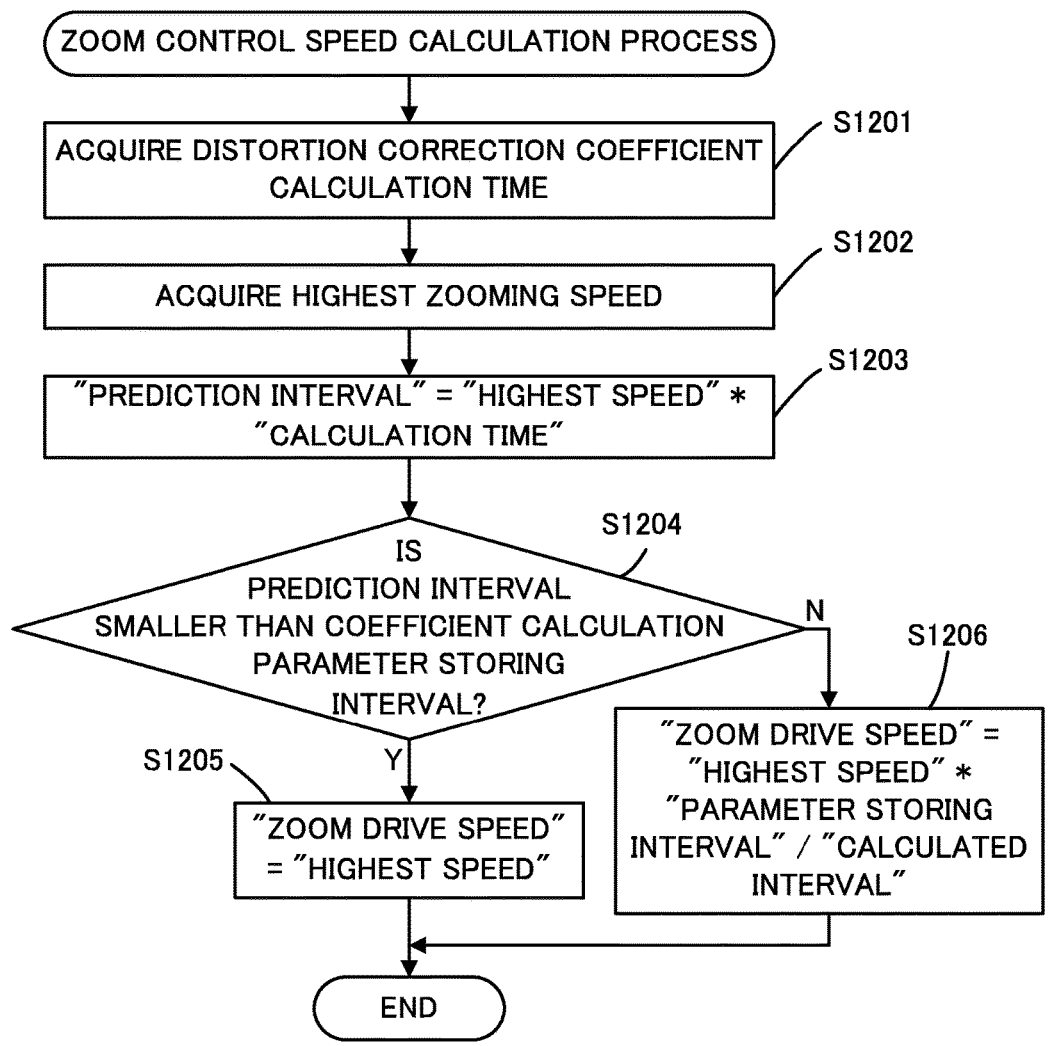
FIG. 12 is a flowchart of a lens zoom drive speed calculation process according to each embodiment of the present invention.

FIG. 12 is a flowchart of the zoom control speed calculation process for calculating the zooming speed in accordance with a distortion correction coefficient calculation time. At step S1201, the microcomputer 105 acquires a time needed to calculate a distortion correction coefficient. This acquisition may made be based on a measured time of the coefficient calculation in an initial state or a previously measured time stored in the non-volatile memory 107. At step S1202, the microcomputer 105 acquires the highest speed of a zoom drive of the lens via the lens control circuit 102.

After that, at step S1203, the microcomputer 105 calculates a prediction interval as the product of the highest speed and the calculation time based on the information acquired at steps S1201 and S1202. At step S1204, the microcomputer 105 compares this prediction interval calculated at step S1203 and the interval at which the correction coefficient parameters used for the distortion correction coefficient calculation are stored. When the prediction interval is smaller, the microcomputer 105 sets the speed of the zoom drive to the highest speed at step S1205. On the other hand, when the prediction interval is larger, the microcomputer 105 sets the speed of the zoom drive to a speed that is "the interval of storing the parameters"/"the prediction interval" times higher than the highest speed at step S1206. In other words, the microcomputer 105 also serves as a setter (setting unit) that sets the zooming speed based on the prediction interval thus calculated and the interval at which the correction coefficient parameters for calculating a distortion correction coefficient are stored. The setter sets the zooming speed to be lower than the highest speed when the prediction interval thus calculated is larger than the interval at which the correction coefficient parameters are stored. Specifically, the microcomputer 105 adjusts the zooming speed so that the prediction interval is equal to the interval at which the parameters are stored.

The above configuration allows a prediction to be performed in accordance with the zooming speed and the distortion correction coefficient calculation time, thereby reducing a delay in applying a distortion correction in the live view.

Embodiment 5

Embodiment 5 of the present invention performs the predicted distortion correction coefficient calculation process while changing a prediction amount depending on a change amount of a distortion correction characteristic. A live view operation is performed in accordance with the flowchart in FIG. 3 similarly to Embodiment 1. This operation is changed to call a predicted distortion correction coefficient calculation process illustrated in FIG. 13 at step S305 where the distortion correction characteristic is predicted.

Figure 13:
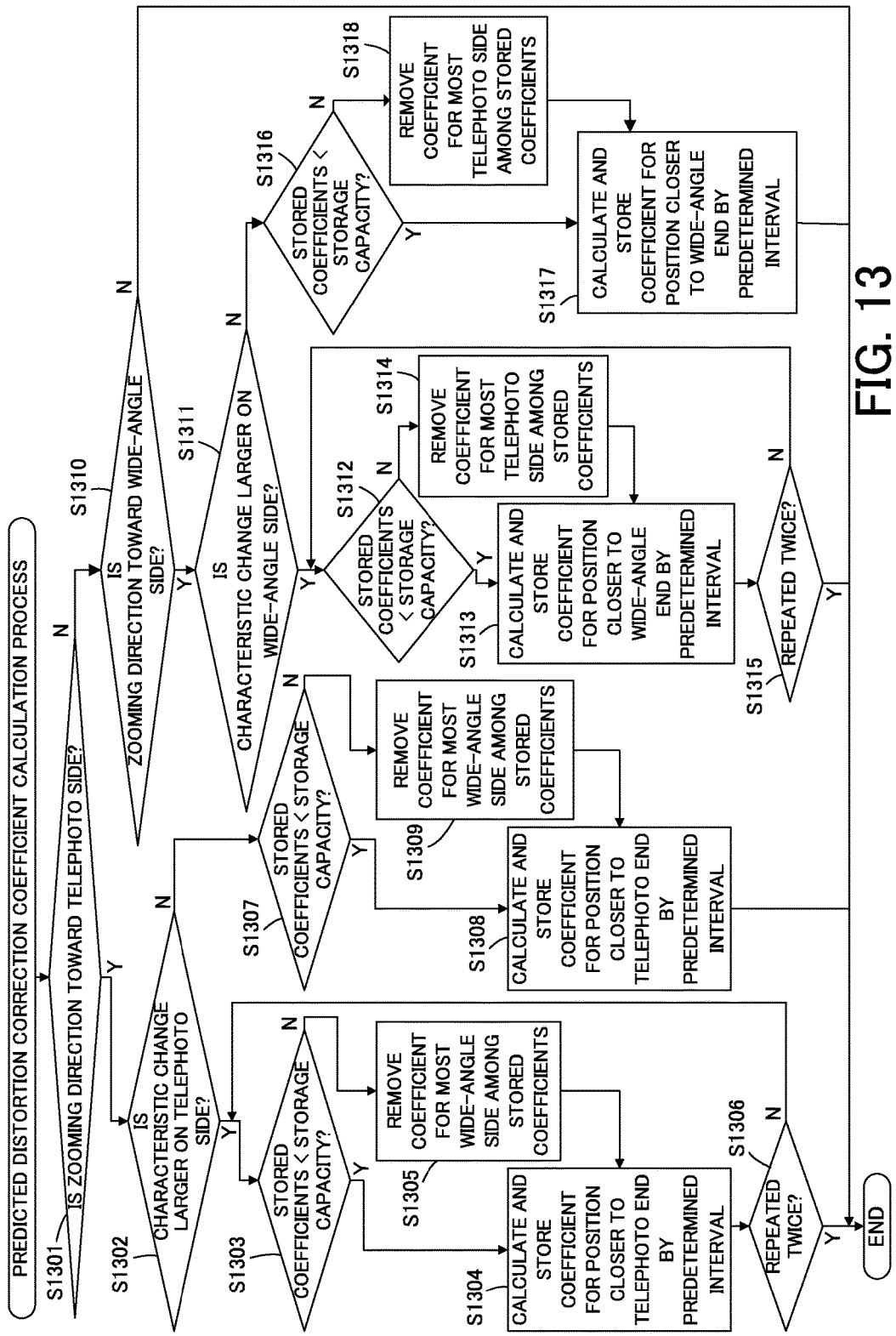
FIG. 13 is a flowchart of a predicted distortion correction coefficient calculation process according to Embodiment 5 of the present invention.

FIG. 13 is a flowchart of the predicted distortion correction coefficient calculation process using the correction coefficient calculation circuit 109. When it is determined at step S1301 that the zooming direction of the lens acquired at step S302 is toward the telephoto side, the microcomputer 105 starts the predicted distortion correction coefficient calculation process for the telephoto side at step S1302. At step S1302, the microcomputer 105 determines whether the change amount of the distortion correction characteristic is larger on the telephoto side as the zooming direction than on the wide-angle side. The comparison of distortion characteristics is based on whether a telephoto side tilt between a point on the most telephoto side on the curve 204 in FIG. 2 for which predicted coefficients are stored and a point closer to the telephoto end than the point on the most telephoto side is larger than a wide-angle side tilt between a point on the most wide-angle side for which predicted coefficients are stored and a point closer to the telephoto end than the point on the most wide-angle side. When it is determined at step S1302 that the telephoto side tilt is larger, the microcomputer 105 determines whether any memory capacity is available to store a predicted distortion correction coefficient to be newly calculated at step S1303. When it is determined that no memory capacity is available, at step S1305, the microcomputer 105 removes the predicted distortion correction coefficient for the most wide-angle side among the stored predicted distortion correction coefficients from the volatile memory 106 to have the memory capacity available. When it is determined at step S1303 that any memory capacity is available, or when the process at step S1305 is completed, at step S1304, the microcomputer 105 specifies a zoom position closer to the telephoto end than those of the stored predicted distortion correction coefficients and performs the distortion correction coefficient calculation process illustrated in FIG. 4 to calculate a predicted distortion correction coefficient.

Specifically, the microcomputer 105 calculates a predicted distortion correction coefficient for a position closer to the telephoto end than those of the stored predicted distortion correction coefficients by the predetermined interval. Then, the microcomputer 105 stores the predicted distortion correction coefficient in the volatile memory 106. At step S1306, unless the processes at steps S1303 and S1304 are repeated twice, the microcomputer 105 returns to step S1303 and repeatedly calculates a predicted distortion correction coefficient on the side where the change amount of the characteristic is larger. When it is determined at step S1302 that the change amount of the distortion correction characteristic is smaller on the telephoto side, the microcomputer 105 determines whether any memory capacity is available to store a predicted distortion correction coefficient to be newly calculated at step S1307. When it is determined that no memory capacity is available, at step S1309, the microcomputer 105 removes the predicted distortion correction coefficient for the most wide-angle side among the stored predicted distortion correction coefficients from the volatile memory 106 to have the memory capacity available. When it is determined at step S1307 that any memory capacity is available, or when the process at step S1309 is completed, at step S1308, the microcomputer 105 specifies a zoom position closer to the telephoto end than those of the stored predicted distortion correction coefficients and performs the distortion correction coefficient calculation process illustrated in FIG. 4 to calculate a predicted distortion correction coefficient. Specifically, the microcomputer 105 calculates a predicted distortion correction coefficient for a position closer to the telephoto end than those of the stored predicted distortion correction coefficients by the predetermined interval. Then, the microcomputer 105 stores the predicted distortion correction coefficient in the volatile memory 106. In other words, when the zooming direction is toward the first side (telephoto side) and the change amount of the aberration characteristic is larger on the first side (telephoto side) based on a relation illustrated in FIG. 2, the microcomputer 105 calculates more correction coefficients than when the change amount of the aberration characteristic is smaller on the first side.

The relation illustrated in FIG. 2 is a relation between the zoom position and the intensity of the distortion characteristic illustrated in FIG. 2. When it is determined at step S1301 that the zooming direction is not toward the telephoto side, the microcomputer 105 determines at step S1310 whether the zooming direction is toward the wide-angle side. When it is determined at step S1310 that the zooming direction of the lens acquired at step S302 is toward the wide-angle side, the microcomputer 105 starts the predicted distortion correction coefficient calculation process for the wide-angle side at step S1311. At step S1311, the microcomputer 105 determines whether the change amount of the distortion correction characteristic is larger on the wide-angle side as the zooming direction than on the telephoto side. The comparison of distortion characteristics is based on whether a wide-angle side tilt between a point on the most wide-angle side on the curve 204 in FIG. 2 for which predicted coefficients are stored and a point closer to the telephoto end than the point on the most wide-angle side is larger than a telephoto side tilt between a point on the most telephoto side for which predicted coefficients are stored and a point closer to the telephoto end than the point on the most telephoto side. When it is determined at step S1311 that the wide-angle side tilt is larger, the microcomputer 105 determines whether any memory capacity is available to store a predicted distortion correction coefficient to be newly calculated at step S1312. When it is determined that no memory capacity is available, at step S1314, the microcomputer 105 removes a predicted distortion correction coefficient for the most telephoto side among the stored predicted distortion correction coefficients from the volatile memory 106 to have the memory capacity available. When it is determined at step S1312 that any memory capacity is available, or the process at step S1314 is completed, at step S1313, the microcomputer 105 specifies a zoom position closer to the wide-angle end than those of the stored predicted distortion correction coefficients, and performs the distortion correction coefficient calculation process illustrated in FIG. 4 to calculate a predicted distortion correction coefficient.

Specifically, the microcomputer 105 calculates a predicted distortion correction coefficient for a position closer to the wide-angle end than those of the stored predicted distortion correction coefficients by the predetermined interval. Then, the microcomputer 105 stores the predicted distortion correction coefficient in the volatile memory 106. At step S1315, unless the processes at steps S1312 and S1314 are repeated twice, the microcomputer 105 returns to step S1312 and repeatedly calculates a predicted distortion correction coefficient on the side where the change amount of the characteristic is larger. When it is determined at step S1311 that the change amount of the distortion characteristic is smaller on the wide-angle side, the microcomputer 105 determines whether any memory capacity is available to store a predicted distortion correction coefficient to be newly calculated at step S1316. When it is determined that no memory capacity is available, at step S1318, the microcomputer 105 removes a predicted distortion correction coefficient for the most telephoto side among the stored predicted distortion correction coefficients from the volatile memory 106 to have the memory capacity available. When it is determined at step S1316 that any memory capacity is available, or the process at step S1318 is completed, at step S1317, the microcomputer 105 specifies a zoom position closer to the wide-angle end than those of the stored predicted distortion correction coefficients, and performs the distortion correction coefficient calculation process illustrated in FIG. 4 to calculate a predicted distortion correction coefficient.

Specifically, the microcomputer 105 calculates a predicted distortion correction coefficient for a position closer to the wide-angle end than those of the stored predicted distortion correction coefficients by the predetermined interval. Then, the microcomputer 105 stores the predicted distortion correction coefficient in the volatile memory 106. In other words, when the zooming direction is toward the first side (wide-angle side) and the change amount of the aberration characteristic is larger on the first side (wide-angle side) based on the relation illustrated in FIG. 2, the microcomputer 105 calculates more correction coefficients than when the change amount of the aberration characteristic is smaller on the first side. When the lens is not moving toward the telephoto side nor the wide-angle side in a stopping state at steps S1301 and S1310, the microcomputer 105 ends the process without calculating a predicted distortion correction coefficient. The processes at steps S1302 and S1311 may compare the distortion characteristics on the telephoto side and wide-angle side of the zoom position to calculate a distortion correction coefficient at a zoom position on a side where the change amount of the distortion characteristic is larger and store the coefficient.

The above configuration allows a prediction to be performed at a position where the distortion characteristic largely changes, thereby reducing a delay in applying a distortion correction to the live view.

Embodiment 6

Figure 14:
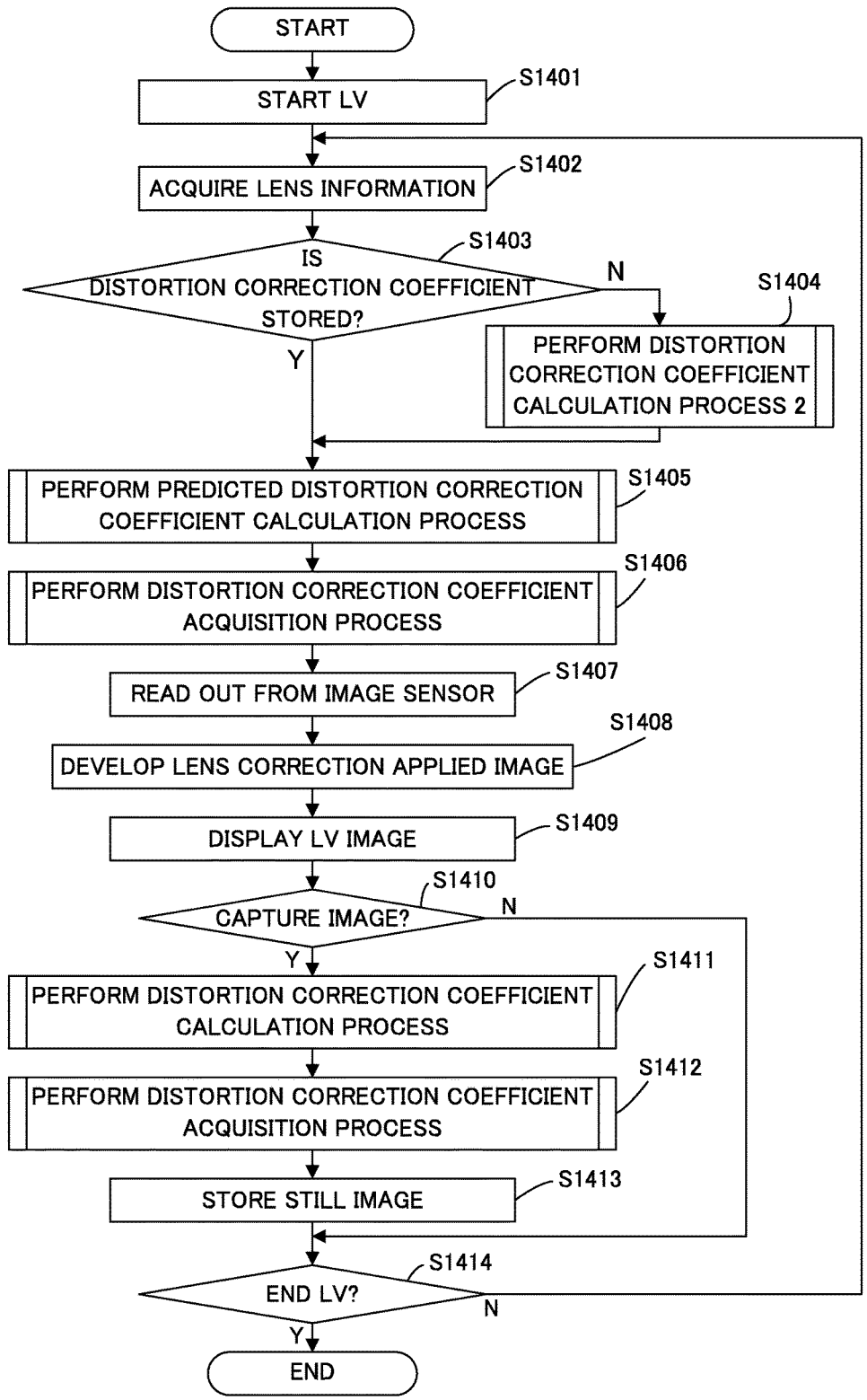
FIG. 14 is a flowchart of live-view image capturing control according to Embodiment 6 of the present invention.

FIG. 14 is a flowchart of control according to Embodiment 6 of the present invention. The microcomputer 105 starts a live view at step S1401. At step S1402, the microcomputer 105 controls the lens control circuit 102 to acquire the lens information such as the zoom position, the zooming direction, the telephoto end, and the wide-angle end of the lens. When it is determined at step S1403 that the volatile memory 106 does not store a distortion correction coefficient corresponding to the zoom position of the lens, the microcomputer 105 executes a distortion correction coefficient calculation process for a live view illustrated in FIG. 15 using the correction coefficient calculation circuit 109 at step S1404. When it is determined at step S1403 that the volatile memory 106 stores the distortion correction coefficient, or after step S1404, the microcomputer 105 executes the predicted distortion correction coefficient calculation process illustrated in FIG. 5 using the correction coefficient calculation circuit 109 at step S1405. At step S1406, the microcomputer 105 executes the distortion correction coefficient acquisition process illustrated in FIG. 6 to acquire the distortion correction coefficient corresponding to the zoom position. At step S1407, the microcomputer 105 reads out image data from the image sensor 103, and applies the distortion correction coefficient acquired at step S1406 to the image processing circuit 108 to develop a live view image at step S1408.

After that, at step S1409, the microcomputer 105 displays the live view image on the display apparatus 111. When it is determined at step S1410 that an image capturing instruction is issued, the microcomputer 105 executes a still image capturing process at steps S1411 to S1413. When no instruction is issued, the microcomputer 105 determines at step S1414 whether an instruction to end the live view is issued. The microcomputer 105 executes the distortion correction coefficient calculation process illustrated in FIG. 4 using the correction coefficient calculation circuit 109 at step S1411, and executes the distortion correction coefficient acquisition process illustrated in FIG. 6 at step S1412. After that, the microcomputer 105 reads out image data from the image sensor 103 at step S1413, applies the distortion correction coefficient acquired at step S1412 to the image processing circuit 108 to develop a still image, and stores the still image in the storage apparatus 110. When it is determined at step S1414 that an instruction to end the live view is issued, the microcomputer 105 ends this series of controls. When no instruction is issued, the microcomputer 105 returns to step S1402 to continue the live view. In this manner, the microcomputer 105 can repeat still image capturing while performing the live view.

Figure 15:
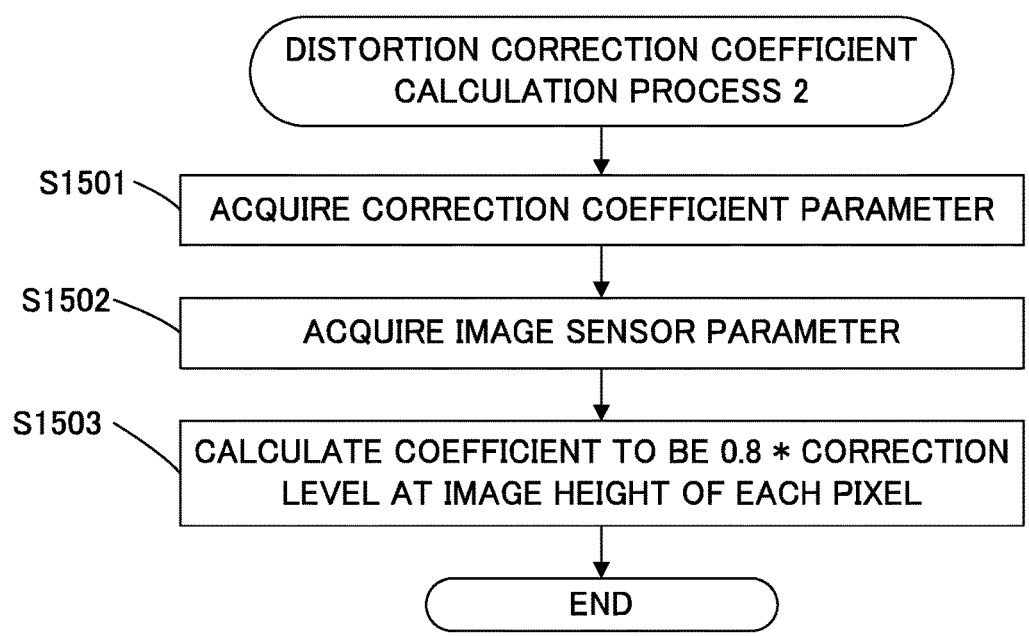
FIG. 15 is a flowchart of a process of calculating a distortion correction coefficient to be applied at live view according to each embodiment of the present invention.

FIG. 15 is a flowchart of the distortion correction coefficient calculation process for a live view using the correction coefficient calculation circuit 109. At step S1501, the microcomputer 105 acquires the correction coefficient parameters from the non-volatile memory 107. The correction coefficient parameters include at least an aberration characteristic at the zoom position, and a correction level at each image height. At step S1502, the microcomputer 105 acquires information of the image sensor from the non-volatile memory 107. The information of the image sensor includes at least the size and the number of pixels of the image sensor. At step S1503, the microcomputer 105 determines a correction method based on the aberration characteristic acquired at step S1501, and calculates a distortion correction coefficient at each pixel based on the correction level at each image height and the size and the number of pixels of the image sensor. In this calculation, the microcomputer 105 sets the correction level to be 0.8 of a normal level. In other words, a first mode (still-image capturing mode) calculates a correction coefficient at a first correction level (that is, an appropriate intensity) (step S1411). A second mode (live view mode or motion-image capturing mode) different from the first mode calculates a correction coefficient at a second correction level lower than the first correction level (step S1404). At the end, at step S1503, the microcomputer 105 stores a calculated coefficient in the volatile memory 106. This prevents an excess correction when zooming is continuously performed.

The above configuration allows a prediction to be performed while an excess correction is prevented when zooming is continuously performed, thereby reducing a delay in applying a distortion correction in the live view.

The present invention can achieve a live view control while applying a distortion correction with a reduced amount of a delay from a zoom change of the lens.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211042, filed on Oct. 15, 2014, which is hereby incorporated by reference herein in its entirety.

What is claimed is:

1. An image processing apparatus comprising:
   at least one non-transitory memory;
   at least one processor;
   an obtaining unit configured to obtain lens information including a zoom position and a zooming direction while a live view image or a motion image is captured;
   a readout unit configured to read out a correction coefficient corresponding to the zoom position included in the lens information obtained by the obtaining unit from the memory, the correction coefficient used for correcting aberration;
   a correction unit configured to perform an aberration correction for the live view image or the motion image by using the correction coefficient read out from the memory; and
   a calculation unit configured to calculate a correction coefficient for correcting aberration corresponding to a zoom position closer to an end of the zoom position in the zooming direction than the zoom position corresponding to the correction coefficient for correcting aberration stored in the at least one memory based on the zooming direction included in the lens information and to store the calculated correction coefficient in the at least one memory,
   wherein the obtaining unit, the readout unit, the correction unit, and the calculation unit are implemented by the at least one processor executing at least one program recorded on the at least one non-transitory memory.

2. The image processing apparatus according to claim 1, wherein the memory removes, when the memory has no capacity available to store the correction coefficient calculated by the calculation unit for the zooming direction toward a first side, a correction coefficient stored for a second side opposite to the first side.

3. The image processing apparatus according to claim 1, wherein the calculation unit calculates, when the zooming direction is toward a first side and the memory stores a correction coefficient at a zoomable end on the first side, a correction coefficient for a second side opposite to the first side.

4. The image processing apparatus according to claim 1, wherein the calculation unit obtains an interval of calculation of the correction coefficient based on a time needed to calculate the correction coefficient and a zooming speed.

5. The image processing apparatus according to claim 4, further comprising a setting unit configured to set the zooming speed based on the interval of calculation of the correction coefficient and an interval at which correction coefficient parameters used by the calculation unit to calculate the correction coefficient are stored,
   wherein the setting unit is implemented by the at least one processor executing at least one program recorded on the at least one non-transitory memory.

6. The image processing apparatus according to claim 5, wherein the setting unit reduces the zooming speed when the interval of calculation of the correction coefficient is greater than the interval at which the correction coefficient parameters are stored.

7. The image processing apparatus according to claim 1, wherein the calculation unit calculates, when the zooming direction is toward a first side and a change amount of an aberration characteristic is greater on the first side based on a relation between the zoom position and an intensity of the aberration characteristic, a greater number of the correction coefficients than when the change amount of the aberration characteristic is less on the first side.

8. The image processing apparatus according to claim 1, wherein the calculation unit calculates a correction coefficient at a first correction level in a first mode, and calculates a correction coefficient at a second correction level less than the first correction level in a second mode different from the first mode.

9. The image processing apparatus according to claim 8, wherein the first mode is a still-image capturing mode, and the second mode is a live view mode or motion-image capturing mode.

10. The image processing apparatus according to claim 1, wherein the correction coefficient is a distortion correction coefficient.

11. An image pickup apparatus comprising:
    at least one non-transitory memory;
    at least one processor;
    an image pickup element which receives light from an object to generate image data;
    an obtaining unit configured to obtain lens information including a zoom position and a zooming direction while a live view image or a motion image is captured by using the image pickup element;
    a readout unit configured to read out a correction coefficient corresponding to the zoom position included in the lens information obtained by the obtaining unit from the memory, the correction coefficient used for correcting aberration;
    a correction unit configured to perform an aberration correction for the live view image or the motion image by using the correction coefficient read out from the memory; and
    a calculation unit configured to calculate a correction coefficient for correcting aberration corresponding to a zoom position closer to an end of the zoom position in the zooming direction than the zoom position corresponding to the correction coefficient for correcting aberration stored in the at least one memory based on the zooming direction included in the lens information and to store the calculated correction coefficient in the at least one memory,
    wherein the obtaining unit, the readout unit, the correction unit, and the calculation unit are implemented by the at least one processor executing at least one program recorded on the at least one non-transitory memory.

12. An image processing method comprising the steps of:
    obtaining lens information including a zoom position and a zooming direction while a live view image or a motion image is captured;

reading out a correction coefficient corresponding to the zoom position included in the lens information obtained in the obtaining step from the memory, the correction coefficient used for correcting aberration;

performing an aberration correction for the live view image or the motion image by using the correction coefficient read out from the memory;

calculating a correction coefficient for correcting aberration corresponding to a zoom position closer to an end of the zoom position in the zooming direction than a zoom position corresponding to the correction coefficient for correcting aberration stored in the memory based on the zooming direction included in the lens information; and storing the calculated correction coefficient in the memory.

\* \* \* \* \*